US012087992B2

(12) United States Patent
Winter et al.

(10) Patent No.: US 12,087,992 B2
(45) Date of Patent: Sep. 10, 2024

(54) COMMUNICATION SYSTEM FOR VEHICLE GUIDED ALONG A PREDETERMINED MOVEMENT PATH

(71) Applicant: Conductix-Wampfler GmbH, Weil am Rhein (DE)

(72) Inventors: Nicholas Winter, Lörrach (DE); Michael Eckle, Müllheim (DE); Bernd Maier, Schliengen (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 272 days.

(21) Appl. No.: 17/429,686

(22) PCT Filed: Sep. 26, 2019

(86) PCT No.: PCT/EP2019/076000

§ 371 (c)(1),
(2) Date: Aug. 10, 2021

(87) PCT Pub. No.: WO2021/004646

PCT Pub. Date: Jan. 14, 2021

(65) Prior Publication Data

US 2022/0209388 A1 Jun. 30, 2022

(30) Foreign Application Priority Data

Jul. 9, 2019 (DE) ..................... 10 2019 118 532.7

(51) Int. Cl.
*H01P 5/12* (2006.01)
*H01P 3/12* (2006.01)
(Continued)

(52) U.S. Cl.
CPC ................ *H01P 5/12* (2013.01); *H01P 5/107* (2013.01); *H01Q 1/32* (2013.01); *H01P 3/12* (2013.01)

(58) Field of Classification Search
CPC ... H01P 5/12; H01P 3/12; H01P 5/107; H01Q 1/32
See application file for complete search history.

(56) References Cited

U.S. PATENT DOCUMENTS 3,278,850 A * 10/1966 Tomizawa ............... H04B 1/40 455/523
5,057,797 A 10/1991 Heddebaut
(Continued)

FOREIGN PATENT DOCUMENTS

CN 101373860 A 2/2009
CN 102893451 A 1/2013
(Continued)

OTHER PUBLICATIONS

Schuck et al., The slotted-waveguide communication system of the maglev test range, Sep. 8, 1983, Proceedings of the 13th European Microwave Conference, p. 681-686 (Year: 1983).*
(Continued)

*Primary Examiner* — Hoang V Nguyen
*Assistant Examiner* — Yonchan J Kim
(74) *Attorney, Agent, or Firm* — Paul D. Bianco; Katharine Davis Wong; Fleit Intellectual Property Law

(57) ABSTRACT

A communications system for communication between a vehicle guided along a predetermined movement path and a stationary station using a slotted waveguide which extends parallel to the movement path and into which an antenna connected to a transmitting and receiving unit of the stationary station and a vehicle antenna project. On the stationary station and on the vehicle, either at least two separate transmitting and receiving units are provided for each respective transmission channel and are provided with a respective antenna connection, or at least one transmitting and receiving unit is provided for at least two transmission channels and is provided with two respective antenna con-
(Continued)

nections. The antenna connections of the transmitting and receiving units are connected to a common antenna via a coupler. The signals of all transmission channels are emitted and received via the common antenna.

14 Claims, 3 Drawing Sheets

(51) Int. Cl.
*H01P 5/107* (2006.01)
*H01Q 1/32* (2006.01)

(56) References Cited

U.S. PATENT DOCUMENTS

| | | | | |
|---|---|---|---|---|
| 6,091,372 | A | 7/2000 | Dienes | |
| 6,108,313 | A * | 8/2000 | Lee | H04B 1/406 333/1.1 |
| 9,136,571 | B2 | 9/2015 | Papziner | |
| 9,824,805 | B2 | 11/2017 | Wechlin | |
| 11,897,526 | B2 | 2/2024 | Winter | |
| 2020/0044360 | A1 | 2/2020 | Kamo | |
| 2020/0223658 | A1 * | 7/2020 | Bauer | B66B 1/3461 |
| 2022/0105971 | A1 | 4/2022 | Winter | |
| 2022/0209384 | A1 | 6/2022 | Winter | |

FOREIGN PATENT DOCUMENTS

| | | | |
|---|---|---|---|
| CN | 104245402 | A | 12/2014 |
| CN | 105281042 | A | 1/2016 |
| CN | 107104697 | A | 8/2017 |
| DE | 10 2012 006412 | A1 | 10/2012 |
| DE | 102012002183 | A1 | 8/2013 |
| DE | 10 2013 002227 | B4 | 11/2014 |
| EP | 1998403 | A1 | 12/2008 |
| JP | 08046545 | A | 2/1996 |
| JP | H10215202 | A | 8/1998 |
| JP | 11284542 | A | 10/1999 |
| JP | 2005051623 | A | 2/2005 |
| WO | 2018/095803 | A1 | 5/2018 |
| WO | 2021/004643 | A1 | 1/2021 |
| WO | 2021/004645 | A1 | 1/2021 |

OTHER PUBLICATIONS

International Search Report (dated Mar. 18, 2020) and Written Opinion for PCT/EP2019/070007, filed Jul. 25, 2019.
Schweber, RF Attenuators: For When You Have Too Much of a Good Thing, Sep. 10, 2015, retrieved from www.digikey.nl/en/articles/techzone/2015/sep/rf-attenuators-for-when-you-have-too-much-of-a-good-thing.
International Preliminary Report on Patentability, dated Jan. 11, 2022, for PCT/EP2019/070007 (English translation).
International Preliminary Report on Patentability, dated Jan. 11, 2022, for PCT/EP2019/076000 (English translation).
International Preliminary Report on Patentability, dated Jan. 11, 2022, for PCT/EP2019/075999 (English translation).
Written Opinion dated Mar. 30, 2020, for PCT/EP2019/070007 (English translation).
Written Opinion dated Apr. 9, 2020, for PCT/EP2019/076000 (English translation).
Written Opinion dated Apr. 9, 2020, for PCT/EP2019/075999 (English translation).
International Search Report (dated Mar. 11, 2020) and Written Opinion for PCT/EP2019/076000, dated Sep. 26, 2019.
Schuck, The slotted-waveguide communication system of the maglev test range, Proceedings of the 13th European Microwave Conference, Sep. 8, 1983, p. 681-686.
Vahle, SMG-Slotted Microwave Guide Table of Contents, May 17, 2006.
Japanese Office Action dated Sep. 20, 2022 for Application No. 2021-529717 with translation (11 pages).
W. D. Schuck and R. Rieger, The Slotted-Waveguide Communication System of the Maglev Test Range in the Emsland, 1983, 13th European Microwave Conference, IEEE, 1983, pp. 681-686.
International Search Report and Written Opinion for PCT/EP2019/075999, filed Sep. 26, 2021.
Vahle, SMG-Slotted Microwave Guide, May 17, 2006 (36 pages).
Chinese First Office Action dated Sep. 28, 2023 for Chinese Application No. 201980089507.X.
Office Action dated Sep. 8, 2023, for U.S. Appl. No. 17/429,697.
Notification of Reasons for Refusal dated Nov. 7, 2023 for Japanese Application No. 2021-529716.
Notification of Reasons for Refusal dated Aug. 22, 2023 for Japanese Application No. 2021-529715.
European Office Action dated Dec. 11, 2023 for European Patent Application No. 19779448.0.

* cited by examiner

COMMUNICATION SYSTEM FOR VEHICLE GUIDED ALONG A PREDETERMINED MOVEMENT PATH

FIELD OF THE INVENTION

The invention concerns a communication system according.

BACKGROUND OF THE INVENTION

Such a communication system is known, for example, from DE 10 2013 002 227 B4. It permits communication with high bandwidth and noise immunity between a vehicle guided along a predetermined movement path and a fixed station. An antenna is arranged on a vehicle so that it projects through a slot into the cavity of a waveguide and can receive and/or transmit electromagnetic waves propagating along the waveguide while the vehicle is moving. A corresponding antenna of a fixed station is arranged at one end of the waveguide.

In a communication system of this type there is a demand for a high data rate, particularly because it is intended control the movement of one or more vehicles from the fixed station and this control is sometimes critical in terms of safety. For example, it must be ensured that a control command to stop in front of an obstacle will reliably reach a vehicle within a predetermined time interval so that a collision with the obstacle can be avoided. A high data rate can be achieved by using system components with correspondingly large bandwidth, which, however, is associated with corresponding costs insofar as such components are available on the market.

SUMMARY OF THE INVENTION

One aspect of the invention is to provide an expedient and cost-effective means of achieving a high data rate for a generic communication system.

Accordingly, a communication system is disclosed herein. Advantageous embodiments are also disclosed.

In a communication system according to the invention for communication between a vehicle guided along a predetermined movement path and a fixed station, using a slotted waveguide that extends parallel to the movement path of the vehicle and into which project at least one antenna connected to a transmitting and receiving device of the vehicle and at least one antenna connected to a transmitting and receiving device of the fixed station, wherein the antenna of the vehicle is moved in the longitudinal direction of the slot during movement of the vehicle, at least two separate transmitting and receiving devices for at least one transmission channel are provided on the fixed station and on the vehicle and the transmitting and receiving devices are each connected via at least one coupler to at least one common antenna, via which the signals of all transmission channels are emitted and received.

An increase in data rate is therefore achieved by providing at least two different transmission channels, for which the slotted waveguide is used as a common transmission medium. At least one additional transmission channel is provided by the use of an additional transmitting and receiving device. In order to be able to transmit and receive with only one antenna, the signals of the different channels are combined by means of at least one coupler on the way to the antenna and are simultaneously fed to the transmitting and receiving devices by means of said coupler in the opposite transmission direction.

However, this permits not only a correspondingly higher data rate, but also simplifies exchange of messages of different categories in comparison with the use of a single-channel transmitting and receiving device of higher bandwidth. For example, messages can easily be assigned to different channels according to their content and/or priority and transmitted by different transmitting and receiving devices so that both the propagation of messages on the transmitter side and their processing on the receiver side are simplified. There is the additional capability that different system components can communicate with one another simultaneously but independently of each other via different transmitting and receiving devices on the side of the fixed station and on the side of the vehicle.

The use of more than a single transmitting and receiving device also creates partial redundancy of the hardware, which permits communication to be maintained even during failure of one of the transmitting and receiving devices, which have higher failure probability as active system components than passive system components. This partial redundancy of the hardware can also be utilized for redundant data transmission, i.e., the same message can be transmitted simultaneously with different transmitting and receiving devices on different channels in order to increase reliability of data transmission. In this case, an increase in data rate is dispensed with in favor of reliability.

The coupler is expediently a three-port coupler that couples a first and second connection with a third connection. If signal paths lead from the first and second connections to different transmitting and receiving devices that are intended to transmit and receive independently of one another, then it is expedient if the coupler decouples the first and second connections from each other. One transmitting and receiving device can be in transmitting mode while the other is in receiving mode. If the attenuation between these connections of the coupler is too low, this would lead to interference in receiving mode. A suitable embodiment of such a coupler is a Wilkinson coupler. This is characterized by low losses between the connections to be coupled and high attenuation between the connections to be decoupled and can be implemented with simple means.

In order to achieve a sufficient range of communication, for long transmission distances it is advantageous that the slotted waveguide consist of two sections separate from each other that extend in opposite directions from a location at which their ends are arranged adjacent to each other, and that each section of the slotted waveguide has its own antenna of the fixed station projecting into the corresponding section. The maximum total length of the transmission path can thereby be significantly increased.

The antennas of the fixed station are preferably arranged at the adjacent ends of the separate sections that are expediently situated at the center of the transmission path. Through this arrangement, its maximum total length can be increased to twice the maximum length of each individual section. The latter is limited by attenuation of the signal during propagation in the slotted waveguide.

When the slotted waveguide consists of two separate sections and two antennas are to be used at the fixed station, an advantageous configuration consists of connecting two couplers in series in the form of reciprocal three-port couplers so that the first and second connections of the first coupler are connected to one of the transmitting and receiving devices, the first and second connections of the second coupler are connected to one of the antennas and the third connections of both couplers are connected to each other. Relative to an arrangement with only one antenna, apart from the second antenna, only an additional coupler of the same type as present in the variant with only one antenna is required as additional system component in order to achieve expansion to operation with two antennas.

In such a configuration, it is an advantageous if the first coupler couple its first and second connections with its third connection and its first and second connections are decoupled and the second coupler couples all three of its connections with each other. While the first coupler is connected to two different transmitting and receiving devices that are not intended to mutually interfere during simultaneous operation, the second coupler is connected to two antennas in different sections of the slotted waveguide, which are not intended to be separated from each other for message transmission but should form a continuous transmission medium. Decoupling between two of the three connections of the second coupler is therefore undesired. Suitable embodiments of the second coupler are a tapper or a reactive power divider. Both are reciprocal three-port couplers that couple all three of their connections to one another, as is desired for the application here, wherein the insertion losses between different pairs of connections are not the same and do not have to be.

If the slotted waveguide consists of two separate sections, it is advantageous that two antennas be arranged on the vehicle one behind the other in the travel direction at a predetermined distance, that the vehicle have two transmitting or receiving devices for at least two different transmission channels, and that two couplers be connected in parallel between two antennas in the two transmitting and receiving devices in the form of reciprocal three-port couplers that couple a first and second connection with a third connection and decouple the first and second connections from each other so that the first connection of each coupler is connected to the first transmitting and receiving device, the second connection of each coupler is connected to the second transmitting or receiving device and the third connection of each coupler is connected to one of the antennas. Each transmitting and receiving device of the vehicle can transmit and receive independently of the others via each antenna of the vehicle.

If the slotted waveguide consists of two sections separated from each other by a gap, the spacing of the antennas on the vehicle is preferably greater than the width of the gap by at least as much so that at least one of the antennas in one of the two sections of the slotted waveguide is in a position ready to transmit and receive. Interruption of communication can then be avoided on passing over a gap between the two sections of the slotted waveguide.

An attenuation element can be optionally connected between the transmitting and receiving devices of the fixed station and/or the vehicle and the corresponding connection of a coupler in order to reduce the power emitted by the antenna to a desired value at a stipulated power of a transmitter or to reduce the power received by an antenna to a desired value before being fed to a receiver. The residual power that flows in undesired fashion between those connections of a coupler that the coupler is actually intended to decouple from each other can also be reduced by such attenuation elements.

A preferred solution for separation of the different transmission channels is their assignment to different frequency bands. The different transmission channels can also consist of at least two transmission channels of a multichannel transmission and receiving device bundled together.

BRIEF DESCRIPTION OF THE DRAWINGS

Embodiment examples of the invention are described below with reference to the drawings. In the drawings

DETAILED DESCRIPTION OF THE INVENTION

Figure 1:
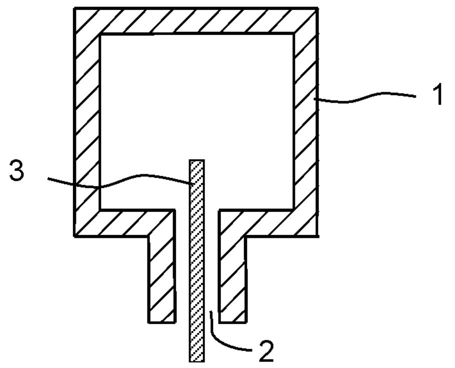
FIG. 1 shows a schematic cross section of a slotted waveguide with an antenna projecting into it.

FIG. 1 shows a schematic cross section of a slotted waveguide 1 as used in the prior art in a communication system for communication between a vehicle 4 guided along a predetermined movement path and a fixed station 5 and/or between several such vehicles with each other. An antenna 3 of a vehicle projects through the slot 2 into the slotted waveguide 1 in order to emit and receive electromagnetic waves that propagate along the slotted waveguide 1. If the vehicle moves along a predetermined movement path, then the antenna 3 moves together with it in the longitudinal direction of the slotted waveguide 1. The vehicle 4 can be guided along a prescribed travel path via rails.

Figure 2:
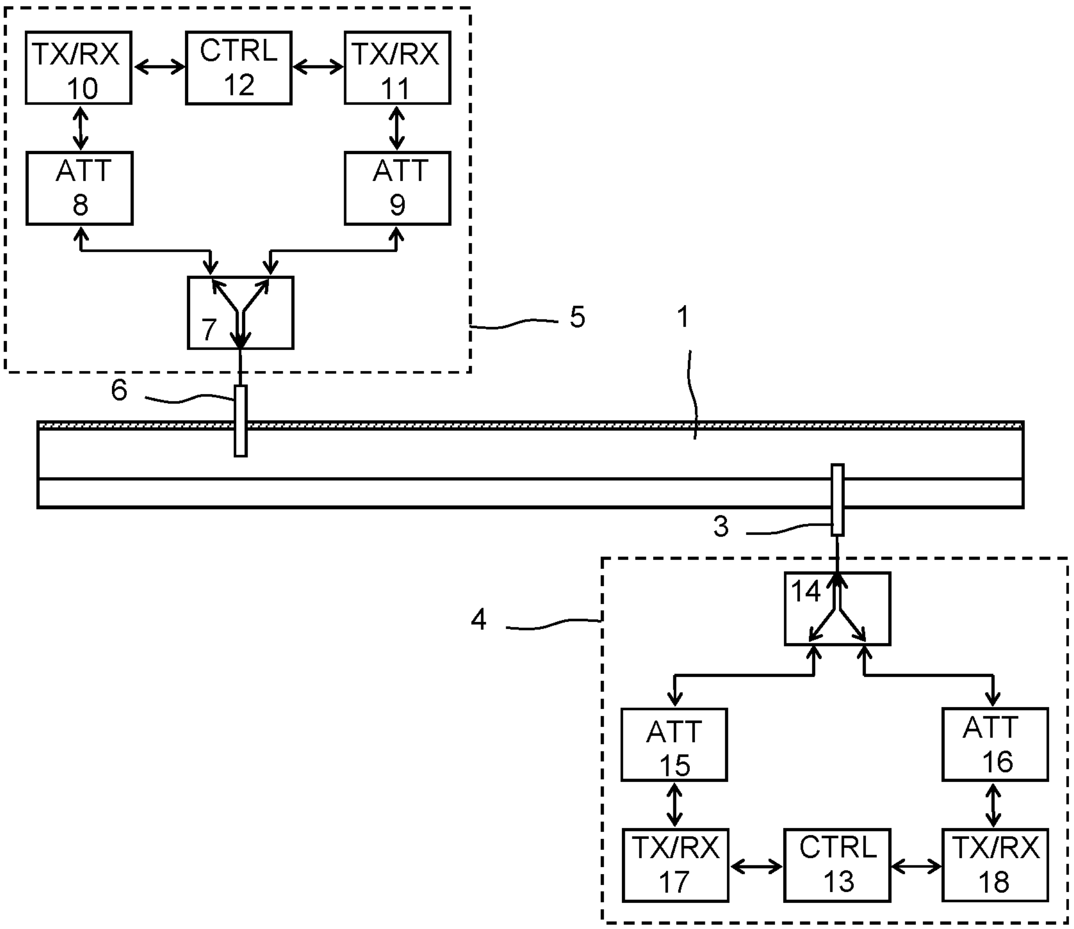
FIG. 2 shows a schematic longitudinal section of a slotted waveguide according to FIG. 1 with a block diagram of additional components of a first embodiment of the communication system according to the invention.

As shown in FIG. 2, an antenna 6 of the fixed station 5 also projects into the slotted waveguide 1. It is connected via a coupler 7 and optional attenuation elements 8 and 9 to two transmitting and receiving devices 10 and 11, hereinafter referred to as transceivers 10 and 11. The antenna 6 of fixed station 5 could also project through the slot 2 into slotted waveguide 1, like the antenna 3 of vehicle 4, but need not do so, since it need not be movable. The transceivers 10 and 11 are connected to a control device 12 of fixed station 5, which controls the entire transport system, which can also include several vehicles 4, and/or monitors its operation by means of video signals and status reports. The control device 12 can exert a controlling function, but need not do so, but just exclusively serve the purpose of monitoring the operation. For this purpose, continuous bidirectional data communication occurs between the control device 12 of fixed station 5 and a control device 13 of vehicle 4 via the slotted waveguide 1 as transmission path.

As also shown in FIG. 2, the antenna 3 of vehicle 4 is also connected via a coupler 14 and optional attenuation elements 15 and 16 to two transmitting and receiving devices 17 and 18, hereinafter referred to as transceivers 17 and 18. The transceivers 17 and 18 are connected to the control device 13 of vehicle 4, which controls movement and other functions of vehicle 4. The components of the part of the communication system according to the invention arranged on board the vehicle and their circuit topology therefore correspond to the part arranged in the fixed station 5.

However, it is not at all necessary to provide only a single control device 12 or 13 on the fixed station 5 or on vehicle 4 as corresponding message source or message sink, but both the transceivers 10 and 11 of the fixed station 5 as well as the transceivers 17 and 18 of the vehicle 4 could each be connected to two message sources or message sinks separate from each other, which are intended to be able to communicate simultaneously but independently of each other. Such simultaneous and independent communication between at least two pairs of message sources and message sinks via a single slotted waveguide is easily permitted by the invention. In particular, in this configuration, messages could also be transmitted simultaneously in opposite directions, for example, one message from transceiver 10 of fixed station 5 to transceiver 17 of vehicle 4 and simultaneously another message from transceiver 18 of vehicle 4 to the transceiver 11 of fixed station 5.

The transceivers 10 and 11 of fixed station 5 operate on different channels, i.e., frequency regions of the frequency band for which the slotted waveguide 1 is suitable as transmission path. The same also applies to transceivers 17 and 18 of the vehicle, transceivers 10 and 17 and transceivers 11 and 18 each operating on the same channel. Through simultaneous use of two transceivers operating on different channels both in fixed station 5 and on board vehicle 4, doubling of the maximum transmittable data rate is obtained in comparison with use of only a single transceiver.

One coupler 7 or 14 each is provided in order to require only a single antenna 6 or 3 to emit and to receive signals both in fixed station 5 and also on board vehicle 4. The coupler 7 of the fixed station has three connections. The antenna 6 of the fixed station 5 is connected to one of them. One of the transceivers 10 and 11 is connected to each of the two other connections, in which case one attenuation element 8 or 9 can be optionally connected between coupler 7 and transceivers 10 and 11. The coupler 7 is direction-selective, i.e., it couples each of the connections to which transceivers 10 and 11 are connected symmetrically with the connection to which the antenna 6 is connected and decouples the two connections to which transceivers 10 and 11 are connected. It therefore acts as a splitter for the received signals, i.e., it distributes the signal power received from the antenna approximately equally to the two transceivers 10 and 11 and acts as a combiner for the transmitted signals of transceivers 10 and 11, i.e., it supplies them together to the single antenna 6. The same naturally applies to the function of coupler 14 of vehicle 4 with respect to the antenna 3 and the transceiver 17 and 18 there.

A suitable design of a coupler 7 or 14 is that of a Wilkinson divider, which consists essentially of two lines each with a quarter wavelength of the center frequency of the frequency band to be transmitted between the antenna connection and each of the two other connections, as well as an absorption resistor between the two other connections. This design of a coupler 7 or 14 can be implemented cost effectively using a printed circuit board or hybrid technology.

The control device 12 of fixed station 5 is connected to both of the transceivers 10 and 11 there and the control device 13 of vehicle 4 is connected to both of the transceivers 17 and 18 there. The control devices 12 and 13 therefore have two channels available for their communication and have much greater bandwidth overall. This permits not only correspondingly higher data rates, but the exchange of messages of different categories is also thereby simplified relative to the use of a single transceiver of greater bandwidth. For example, messages can be distributed according to content and/or priority to the two different channels so that the processing of messages is simplified. If necessary, the bandwidths of the channels can be different with this type of distribution of data of different categories on different channels. For example, a video signal can be transmitted on a channel with a bandwidth of 40 MHz and control data on a channel with a bandwidth of 20 MHz.

Moreover, partial redundancy of hardware is created by the two transceivers 10 and 11 or 17 and 18 and optionally the two connected attenuation elements 8 and 9 or 15 and 16. When a transceiver and/or attenuation element fails, all communication can occur via the still functional part of the communication system so that total failure of the communication system is avoided and its reliability increased. This is particularly significant for transceivers 10 and 11 or 17 and 18, since, as active components, they have a greater probability of failure than passive components, like antennas 3 and 6, couplers 7 and 14 and attenuation elements 8, 9, 15 and 16. However, a single message can also be simultaneously transmitted over both transceivers 10 and 11 or 17 and 18 in order to increase the reliability of transmission.

As already mentioned, instead of just one control device 12 or 13, two independent units that are connected to one of the transceivers 10 and 11 or 17 and 18 and function as sources or sinks of the messages sent or received by transceivers 10 and 11 or 17 and 18 could be present both at fixed station 5 and on board vehicle 4.

Figure 3:
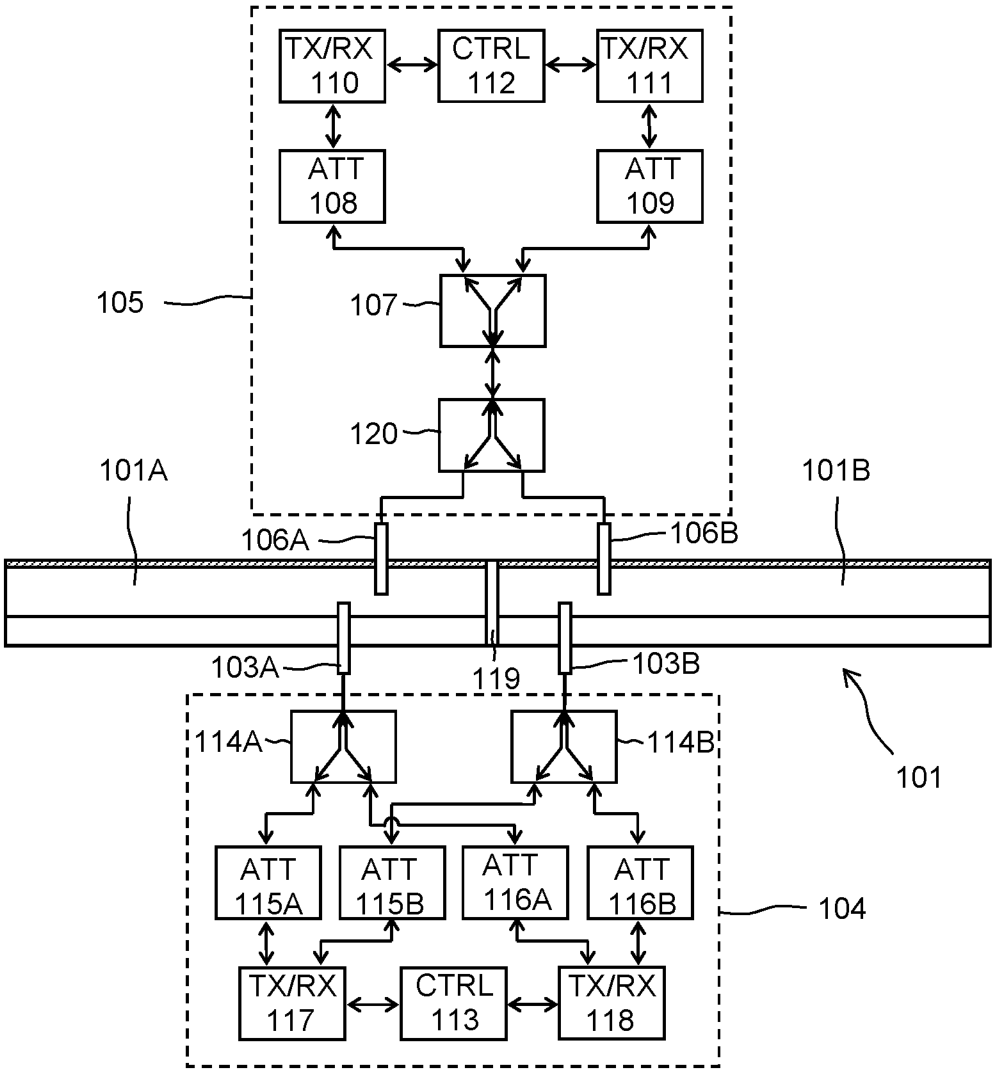
FIG. 3 shows a schematic longitudinal section of a slotted waveguide according to FIG. 1 with a block diagram of additional components of a second embodiment of the communication system according to the invention.

FIG. 3 shows a second embodiment of a communication system according to the invention. This embodiment is provided for transport systems of greater length, in which the fixed station 105 is arranged not at one end, but offset in the direction of the center of the transport path or directly at its center to achieve sufficient range of communication, and the slotted waveguide 101 consists of at least two different sections 101A and 101B that are separated from each other by a gap 119 functioning as an expansion gap for a thermal change in length. Two separate antennas 106A and 106B are provided, each of which is assigned to one of the different sections 101A or 101B of the slotted waveguide 101 and connected to a common control device 112 of fixed station 105. Two couplers 107 and 120 are provided for this purpose, the design of coupler 107 being the same as that of coupler 7 of the first embodiment. The first two connections of the first coupler 107 are connected to transceivers 110 and 111 via optional attenuation elements 108 and 109, like the corresponding connections of coupler 7 of the first embodiment to the transceivers 10 and 11 there.

The second coupler 120 can be of different design, since the same requirements do not exist with respect to decoupling of two of its connections, as in coupler 107. In contrast, it can even be desirable for the second coupler 120 to have the smallest possible attenuation between all three of its connections in order to couple both antennas 106A and 106B not only with the first coupler 107, but also with each other in order to make signals sent from a vehicle 104 in one of the two sections 101A or 101B of the slotted waveguide 101 receivable for another vehicle 104 situated in the other section 101B or 101A, thereby avoiding collisions between transmitted signals of different vehicles 104. A suitable type of coupler for this purpose is a tapper.

However, a single antenna is not connected to the third connection of coupler 107, but the third connection of the second coupler 120. The antennas 106A and 106B are connected to the first two connections of the second coupler 120. These are decoupled from each other by the second coupler 120 and each coupled with the third connection. Through this circuit the signals received from both antennas 106A and 106B are first combined by the second coupler 120, and the combined signal is then fed by the first coupler 107 to the two transceivers 110 and 111 with uniform division of its power. The transmitted signals emitted in the opposite direction by the two transceivers 110 and 111 are first combined by the first coupler 107 and the combined signal then fed by the second coupler 120 to the two antennas 106A and 106B for emission with uniform distribution of its power.

In this way, the transmitted signals of both transceivers 110 and 111 are uniformly emitted in both sections 101A and 101B of the slotted waveguide 101 and the signals received from both sections 101A and 101B of the slotted waveguide 101 by the antennas 106A and 106B are fed to both transceivers 110 and 111. The gap 119 between sections 101A and 101B of the slotted waveguide 101 is preferably situated at the center of the travel path of the transport system, and the antennas 106A and 106B are arranged close to gap 119 so that the maximum range of communication is doubled in comparison with the arrangement of a single antenna at one end of a single slotted waveguide.

The two antennas 103A and 103B of vehicle 104 are offset relative to each other in its travel direction so that an antenna 103A extends into section 101A and the other antenna 103B extends into section 101B of the slotted waveguide 101 at a gap 119 between sections 101A and 101B of the slotted waveguide 101. Interruption of communication is thus avoided when the vehicle 104 travels over a gap 119 between sections 101A and 101B of the slotted waveguide 101, especially when an antenna 103A or 103B is situated in the region of gap 119 and a signal therefore can no longer be transmitted via this antenna 103A or 103B.

Two transceivers 117 and 118 are provided on board vehicle 104, which operate on the same channels as transceivers 110 and 111 of the fixed station so that a transceiver 117 or 118 of vehicle 104 is assigned to each transceiver 110 and 111 of the fixed station. The transceivers 117 and 118 each have two connections for signal paths leading to one antenna. A signal path leads from the first of these connections to the first antenna 103A and a signal path leads from the second of these connections to the second antenna 103B, so that each transceiver 117 and 118 is connected to each of the antennas 103A and 103B.

To implement this, the antennas 103A and 103B are each connected to a third connection of a coupler 114A or 114B, which is of the same design as the coupler 107 of the fixed station 105. The first connection of each of these couplers 114A and 114B is connected to a connection of the first transceiver 117 via an optional attenuation element 115A or 115B. The second connection of each of these couplers 114A and 114B is connected to a connection of the second transceiver 118 via an optional attenuation element 116A or 116B. The couplers 114A and 114B each couple their first and second connections with their third connection and decouple their first and second connections from each other. At any time, there is therefore a continuous signal path between each transceiver 110 and 111 of the fixed station 105 to the correspondingly assigned transceiver 117 and 118 of vehicle 104, especially when the vehicle 104 travels over the gap 119 between the slotted waveguide sections 101A and 101B and one of the two antennas 103A or 103B of the vehicle 104 is situated in the region of gap 119.

It is also possible that the range of communication is sufficient with a circuit arrangement of the fixed station 5 according to the first embodiment of FIG. 2 that has only a single antenna 6 and a single coupler 7, but a slotted waveguide 101 consisting of two separate sections 101A and 101B with a gap 119 functioning as an expansion gap is required to equalize a thermal expansion of length. In this case, antennas that are connected by a flexible conductor piece are arranged on the facing ends of the different sections 101A and 101B of the slotted waveguide 101 at the gap 119. Through this arrangement of passive elements, signal transmission occurs between the sections 101A and 101B of the slotted waveguide 101. Due to the presence of gap 119, however, two antennas 103A and 103B are required on board vehicle 104, one behind the other in the longitudinal direction, along with a part of the communication system on the vehicle side corresponding to the second embodiment of FIG. 3, if communication free of interruption is to be ensured on passing over gap 119.

Figure 4:
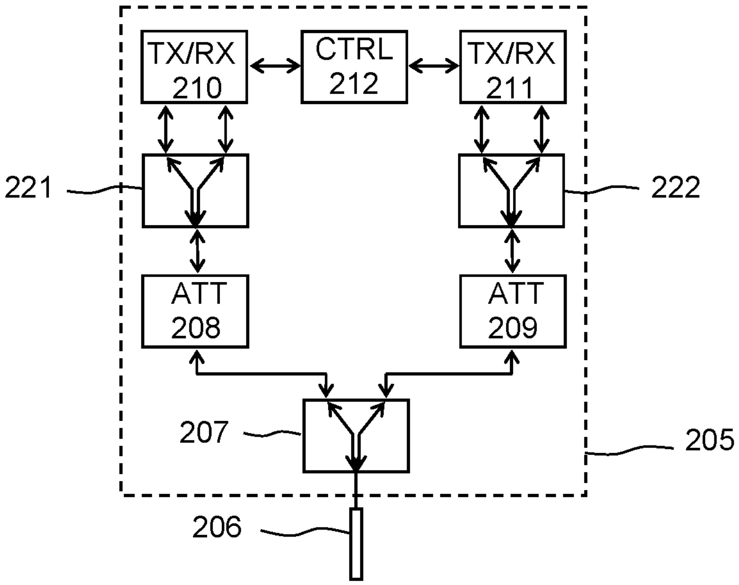
FIG. 4 shows a block diagram of components of a third embodiment of the communication system according to the invention arranged at a fixed station.

FIG. 4 shows the block diagram of the part of a third embodiment of a communication system according to the invention arranged in or on a fixed station 205. This embodiment differs from the first embodiment according to FIG. 2 in that the two transceivers 210 and 211, to which the control device 212 of fixed station 205 is connected, each have two separate connections for antennas that are assigned to different channels. Said two-channel transceivers 210 and 211 with two antenna connections are known per se. Each of the two antenna connections is connected to an optional attenuation element 208 or 209 initially via a first coupler 221 or 222 and then to a first or second input of a coupler 207 with the same design as the coupler 7 of the first embodiment. An antenna 206 is connected to the third connection of coupler 207. The configuration according to FIG. 4 can be used not only on the side of the fixed station, but also as a mirror image on the side of the vehicle, i.e., it can replace the configuration on the vehicle side depicted in FIG. 1.

The coupling of the two antenna connections of transceivers 210 and 211 by couplers 221 and 222 results in a bundling of the two channels of each of the individual transceivers 210 and 211 to form a channel of twice the bandwidth, which therefore permits a doubled data rate of a single channel. This channel bundling is known per se and is not an object of the present invention. It is merely demonstrated with this embodiment example that the coupling according to the invention of different transmission and receiving devices with a common slotted waveguide antenna can also be applied to already bundled channels of such transmitting and receiving devices. By analogy with the first embodiment of FIG. 1, the configuration according to FIG. 4 can also be used on the vehicle side.

The configuration according to FIG. 4 can also be applied to an embodiment with two antennas. Thus, in the second embodiment according to FIG. 3, the part of the communication system that consists of the control device 112, the transceivers 110 and 111, the attenuation elements 108 and 109 as well as the coupler 107 can be replaced by the configuration of FIG. 4, except for the antenna 206 there. Instead of antenna 206, in this case coupler 120 is connected to coupler 207 and the antennas 106A and 106B are connected to its other two connections.

In this case, two transceivers each with four antenna connections are required on the vehicle side, which would connect four optional attenuation elements and two couplers corresponding to coupler 207 to the two antennas of the vehicle via a total of four couplers corresponding to couplers 221 and 222, in which case the connections between the couplers on the antenna side and the optional attenuation elements and the optional attenuation elements on the transceiver side partially intersect, similar to the configuration of FIG. 3, on the vehicle side in order to provide a signal path between each of the two antennas and each of the two antenna connections of each transceiver.

Two single channel transceivers or two two-channel transceivers each with channel bundling are provided in the above-described embodiment examples. This is not to be understood as a constraint of the invention to two channels. The invention instead also includes configurations with more than two channels. For example, a three-channel system could be implemented by using three transceivers in the fixed station and in the vehicle in combination with couplers in the form of reciprocal four-port couplers that each couple one of the ports with the other three and decouple the other three from each other. Wilkinson couplers with four connections can be considered for this purpose. For a communication system with four channels, four transceivers could be provided in the fixed station and in the vehicle and three couplers could be combined cascaded in two stages each with three connections, as in the embodiment examples described here, in order to divide a signal from an input into four outputs and to combine signals from four inputs into one output in the opposite direction.

The invention claimed is:

1. A communication system for communication between a vehicle guided along a predetermined movement path and a fixed station, the communication system using a slotted waveguide that extends parallel to the predetermined movement path of the vehicle and into which projects at least one antenna connected to a transceiver of the fixed station and into which projects at least one antenna of the vehicle, wherein the at least one antenna of the vehicle is moved in a longitudinal direction of the slotted waveguide during movement of the vehicle, wherein at least two separate transceivers, each having at least one transmission channel differing in its frequency band from the transmission channel of the other transceiver are provided on the fixed station, wherein at least two separate transceivers, each having at least one transmission channel differing in its frequency band from the transmission channel of the other transceiver are provided on the vehicle, wherein the at least two separate transceivers on the fixed station are connected via at least one fixed station coupler to at least one common antenna and the at least two separate transceivers on the vehicle are connected via at least one vehicle coupler to at least one common antenna on the vehicle, and wherein signals of all transmission channels are transmitted and received via the at least one common antenna on the fixed station and the at least one common antenna on the vehicle.

2. The communication system according to claim 1, wherein at least one of the at least one fixed station coupler and the at least one vehicle coupler is a reciprocal three-port coupler that couples a first and second connection with a third connection.

3. The communication system according to claim 2, wherein the at least one of the at least one fixed station coupler and the at least one vehicle coupler decouples the first and second connections from each other.

4. The communication system according to claim 3, wherein the at least one of the at least one fixed station coupler and the at least one vehicle coupler is a Wilkinson coupler.

5. The communication system according to claim 1, wherein the slotted waveguide includes two sections separate from each other that extend in opposite directions from a location at which their ends are arranged adjacent to each other, and wherein each section of the two sections of the slotted waveguide has an antenna of the fixed station projecting into a corresponding section.

6. The communication system according to claim 5, wherein antennas of the fixed station are arranged in each of the two sections of the slotted waveguide close to the location at which their ends are adjacent to each other.

7. The communication system according to claim 5, wherein the at least one fixed station coupler comprises two couplers in the form of reciprocal three-port connection couplers connected in series between the at least two separate transceivers of the fixed station and two antennas, so that first and second connections of a first coupler of the two couplers are connected to one of the at least two separate transceivers of the fixed station, first and second connections of a second coupler of the two couplers are connected to one of the two antennas, and a third connection of the first and second couplers are connected to each other.

8. The communication system according to claim 7, wherein the first coupler couples the first and second connections of the first coupler with the third connection of the first coupler and decouples the first and second connections of the first coupler from each other, and wherein the second coupler couples all three connections of the second coupler to each other.

9. The communication system according to claim 8, wherein the second coupler is a tapper or a reactive power divider.

10. The communication system according to claim 1, wherein two antennas are arranged one behind another in a travel direction at a predetermined spacing on the vehicle, wherein the at least two separate transceivers on the vehicle have at least two different transmission channels, and wherein the at least one vehicle coupler comprises two couplers in the form of reciprocal three-port couplers connected in parallel between the two antennas and the at least two separate transceivers on the vehicle, which couple a first and second connection with a third connection and decouple the first and second connection from each other, so that a first connection of each coupler of the two couplers is connected to a first transceiver of the at least two separate transceivers on the vehicle, a second connection of each coupler of the two couplers is connected to a second transceiver of the at least two separate transceivers on the vehicle, and a third connector of each coupler of the two couplers is connected to one of the two antennas.

11. The communication system according to claim 10, wherein the slotted waveguide includes two sections separated from each other by a gap, and wherein spacing of antennas on the vehicle is at least greater than a width of the gap to an extent such that at least one of the antennas is always in position to transmit and receive signals in one of the two sections of the slotted waveguide.

12. The communication system according to claim 10, wherein the at least two different transmission channels each include at least two transmission channels bundled together in a multichannel transceiver.

13. The communication system according to claim 1, further comprising an attenuation element connected between a transceiver of the fixed station and a connection of a coupler of the at least one fixed station coupler assigned thereto.

14. The communication system according to claim 1, further comprising an attenuation element connected between a transceiver of the vehicle and a connection of a coupler of the at least one vehicle coupler assigned thereto.

* * * * *